United States Patent Office 3,441,618
Patented Apr. 29, 1969

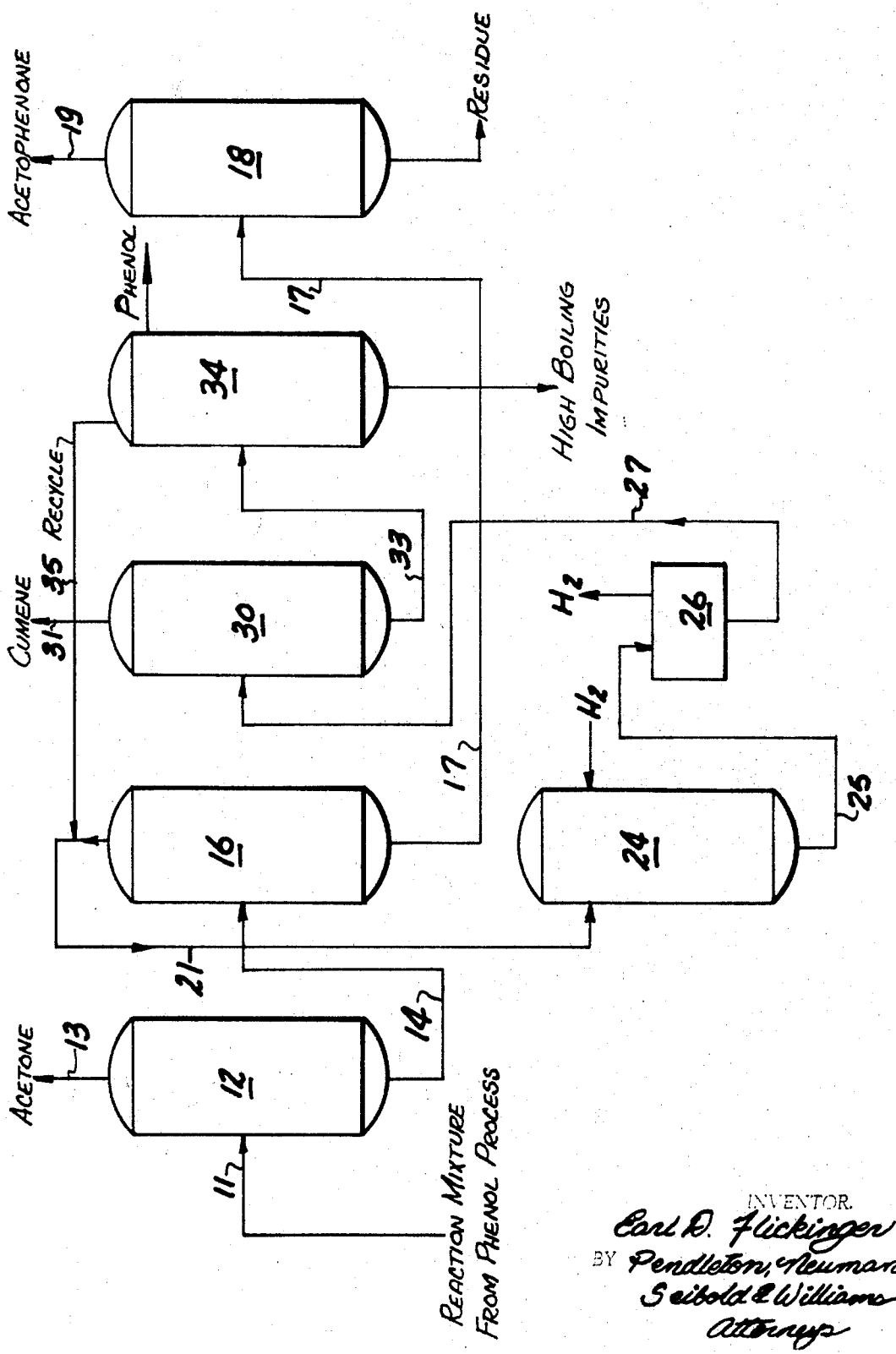

3,441,618
HYDROGENATION PROCESS
Earl Dan Flickinger, El Dorado, Kans., assignor to Skelly Oil Company, Tulsa, Okla., a corporation of Delaware
Filed June 15, 1966, Ser. No. 557,744
Int. Cl. C07c 39/12, 5/10
U.S. Cl. 260—621                                    4 Claims

ABSTRACT OF THE DISCLOSURE

A process of hydrogenating a mixture comprising phenol, cumene and α-methylstyrene utilizing a hydrogenation catalyst containing nickel, molybdenum or palladium to convert α-methylstyrene to cumene and to improve the quality of the phenol.

---

This invention relates to the treatment of a reaction mixture resulting from a process for producing phenol by the oxidation of cumene and the subsequent decomposition of the resulting cumene hydroperoxide.

The production of phenol by the oxidation of cumene and the decomposition and dehydration of the resulting products is well known. Various products in addition to the phenol are usually obtained as a result of this process, including acetone, α-methylstyrene, acetophenone and a residue of polymeric materials. The reaction mixture may also contain unreacted cumene. From an economic standpoint it is desirable to convert the α-methylstyrene to cumene, which can then be used for the production of additional phenol. It is known in the art that α-methylstyrene can be converted to cumene by hydrogenation. The prior art processes for accomplishing this generally involve separation of an α-methylstyrene stream and selective hydrogenation of the stream.

It is likewise well known that phenol produced in this manner contains color-forming impurities which, when the phenol is subjected to chlorination and/or sulfonation, produces intensely colored derivatives. In many cases this intense color in chlorinated or sulfonated phenols is undesirable. A conspicuous example of undesired color formation is in the preparation of chlorinated phenols, such as pentachlorophenol which is used extensively for preserving wood, or in the preparation of tetrachlorophenol which is a general disinfecatnt and fungicide finding widespread use for preserving cellulosic products including paper, insulation board, wood and the like. Thus, it is frequently observed that when phenol manufactured by the cumene process is chlorinated to produce, for example, pentachlorophenol, the resulting product has an undesirable red color. The colored chlorophenol product cannot therefore be used satisfactorily in the preservation of those wood products where it is desired to retain their natural color. Similarly, where it is desired to prepare a clear resin product, for example by interaction of phenol and formaldehyde, undesirable color formation occurs with untreated phenol even in spite of the fact that phenol appears to be clear and free of undesirable color precursors. Similar problems are encountered when phenols are sulfonated for one purpose or another.

It has now been found in accordance with the present invention that it is possible to hydrogenate α-methylstyrene in a reaction mixture from a phenol production process to convert effectively the α-methylstyrene to cumene and at the same time inactivate or render innocuous the connate color-forming impurities in the phenol.

In accordance with the persent invention a reaction mixture comprising acetone, phenol, α-methylstyrene, cumene, acetophenone and high boiling polymeric materials is subjected to a distillation to remove acetone. The remaining reaction mixture, relatively free of acetone, is then subjected to a further distillation to separate therefrom a three-component mixture of phenol, α-methylstyrene and cumene. This ternary mixture is then subjected to hydrogenation using as a hydrogenation catalyst palladium or nickel-molybdenum. This hydrogenation accomplishes the desired results, namely the substantially complete conversion of α-methylstyrene to cumene, and at the same time inactivates or renders innocuous the connate color-forming impurities which are generally found in phenol produced by the decomposition of cumene hydroperoxide. After hydrogenation the hydrotreated mixture can then be fractionated to recover cumene and phenol.

Inasmuch as the undesired color-forming materials generally present in the phenol can be inactivated or rendered innocuous using mild hydrogenation conditions and α-methylstyrene can be converted to cumene under the same conditions it is preferred to employ relatively mild hydrogenation conditions to avoid the possibility of adversely affecting the phenol itself. While the hydrogenation conditions can vary widely and are not critical with respect to the desired objectives, the hydrogenation is preferably carried out at relatively low temperatures ranging from about 50 to 300° F., preferably 150 to 225° F., and pressures of from atmospheric to 500 p.s.i.g., preferably atmospheric to 100 p.s.i.g. The space velocity is not critical and can be varied for optimum processing economy. A space velocity from about 1.0 to 2.25 v./v./hr. or higher can be employed satisfactorily. Sufficient hydrogen is employed to insure that all of the connate color-forming materials in the phenol undergo hydrogenation and also to insure substantially complete conversion of α-methylstyrene to cumene. A large excess of hydrogen can be employed economically since the hydrogen can be recycled with very little loss thereof. Thus, an excess of hydrogen such as, for example, 1100 to 3000 more or less standard cubic feet per barrel of the mixture to be hydrotreated is economically feasible. It is preferred to maintain the purity of the recycled hydrogen above 90%, particularly if the recycle stream includes hydrogen from chemical processes such as are frequently carried out in the petroleum refining industry.

The hydrogenation catalyst can be employed in a finely divided state or supported on a suitable base or carrier such as alumina, charcoal, silica alumina, silica gel, kieselguhr and the like. If the hydrogenation catalysts are supplied in the form of metal oxides, the catalysts can be reduced prior to use in the present invention. The percentage of the metal in the catalyst can vary widely and may, for example, range from 0.1 to 17% or more.

The advantages of the present invention will become further apparent from the following detailed description thereof taken in conjunction with the drawing which represents a schematic flow sheet.

Thus, the entire reaction mixture resulting from the oxidation of cumene and decomposition and dehydration of the oxidation product including a mixture of acetone, phenol, α-methylstyrene, acetophenone, unreacted cumene and a residue comprising polymeric materials passes through line 11 into distillation zone 12 which is operated at substantially atmospheric pressure and wherein acetone is distilled from the reaction mixture and passed overhead through line 13 to storage.

The substantially acetone-free mixture is withdrawn from the base of distillation zone 12 and transferred via line 14 to separation zone 16. Separation zone 16 is operated at a temperature from about 40° C. to 182° C., preferably 60° C. to 110 C., and a pressure from about 1 millimeter to 760 millimeters, preferably 4 millimeters to 60 millimeters, to remove an overhead stream comprising phenol, cumene and α-methylstyrene, the relative amounts of each being, for example depending upon the particular operation, about 69% phenol, 28% cumene and 3% α-methylstyrene. The bottoms from separation zone 16 which contain polymeric residue materials and acetophenone are sent via line 17 to separation zone 18. Separation zone 18 can be operated at a temperature of from about 15° C. to 200 C. and a pressure from 1 to 760 millimeters for distillation of acetophenone which is taken overhead through line 19.

The overhead from separation zone 16 comprising, as indicated, phenol, cumene and α-methylstyrene, is sent via line 21 to hydrogenation zone or hydrotreater 24.

In hydrotreater 24, hydrogenation of the mixture is effected for example at a temperature of 200° F. and a pressure of about 100 p.s.i.g. using a nickel-molybdenum hydrogenation catalyst. After hydrotreating the hydrotreated mixture is conveyed through line 25 to hydrogen separator 26 and from their via line 27 to distillation zone 30. Distillation zone 30 is operated at a temperature from about 38° C. to 153° C. and a pressure from about 10 millimeters to 760 millimeters to separate cumene which is taken overhead through line 31. The bottoms from distillation tower 30 comprising principally phenol are sent via line 33 to distillation tower 34. In distillation tower 34 phenol is separated from high boiling impurities which may be associated therewith and distilled overhead at a temperature of about 40° C. to 182° C. at a pressure of 1 millimeter to 760 millimeters. If desired, 10% or more of the lightest overhead fraction of the phenol stream can be recycled through line 35 for additional treatment in hydrogenation zone 24 to insure more complete conversion of α-methylstyrene to cumene.

The following examples give specific data on the process of the present invention.

EXAMPLE I

A mixture of products resulting from the oxidation of cumene followed by decomposition and dehydration of the reaction product was subjected to distillation to remove acetone. After distillation of the major amount of acetone, the feed mixture including a relatively small amount of acetone, cumene, α-methylstyrene (AMS), phenol, acetophenone and high boiling polymeric materials was distilled to remove an overhead stream comprising cumene, α-methylstyrene, phenol and a small amount of acetone. This stream was then charged to a hydrotreater wherein hydrogenation was effected using a nickel-molybdeum catalyst of the following typical analysis.

Physical properties:
  Surface area, m²/gm. _____ 200–300
  Pore volume, cc./gm. _____ 0.50–0.60
  Average pore diameter, A. _____ 100–120
  Apparent bulk density, lb./cu. ft. _____ 30–40
  Side crush strength, lb.—
    3/16″ x 3/16″ tablets _____ 25±5
    1/8″ diam. extrusion _____ 20±5
    1/12″ diam. extrusion _____ 15±3
    1/16″ diam. extrusion _____ 10±2
Chemical composition (wt. percent):
  Nickel oxide, NiO _____ 3.5–4.5
  Molybdenum oxide, MoO₃ _____ 13.0–15.0
  Sodium oxide, Na₂O _____ percent max.___ 0.05
  Iron oxide, Fe₂O₃ _____do____ 0.20
  Chlorides _____do____ 0.10

This catalyst was prereduced with hydrogen for six hours at 300 p.s.i.g. above 700° F. before using.

Table I shows the amounts of each component in the feed mixture or charge before hydrotreating and the amounts of each after hydrotreating at different temperature and a space velocity of 1.05 v./v./hr. in each case.

TABLE I

| Sample | Hydrogenator hottest temp., °F. | Press., p.s.i.g. | Percent acetone | Percent cumene | Percent AMS | Percent phenol | pH | Hellige comparator No. 600DA chlorination color |
|---|---|---|---|---|---|---|---|---|
| Charge | | | 0.1 | 35.2 | 0.9 | 63.8 | 3.9 | 20 |
| Run No. 1 | 224 | 100 | 0.1 | 36.7 | 0.0 | 63.2 | 4.0 | 1 |
| Run No. 2 | 197 | 100 | 0.6 | 35.5 | 0.2 | 63.7 | 5.3 | 2 |

EXAMPLE II

Using the same catalyst described in Example I, a mixture similar to that of Example I but containing higher percentages of cumene and α-methylstyrene was hydrotreated with the following results, using a space velocity of 1.05 v./v./hr. in each case.

TABLE II

| Sample | Hydrogenator hottest temp., °F. | Press., p.s.i.g. | Percent acetone | Percent cumene | Percent AMS | Percent phenol | pH | Hellige No. 600DA chlorination color |
|---|---|---|---|---|---|---|---|---|
| Charge | | | Trace | 38.3 | 6.8 | 54.9 | 4.2 | 8 |
| Run No. 3 | 221 | 100 | Trace | 45.5 | 0.0 | 54.5 | 5.2 | Below 1 |
| Run No. 4 | 196 | 100 | Trace | 45.0 | 0.6 | 54.4 | 5.2 | 2 |

Unchlorinated samples of the mixtures from Run No. 3 and Run No. 4 were then heated one hour at 120–130° C., cooled, and chlorinated in the manner described previously. Run No. 3 then gave a chlorinated color of 1 on the Hellige scale, indicating that color improvement of the phenol would be maintained after subsequent fractionation of the mixture.

EXAMPLE III

A mixture of products resulting from the oxidation of cumene followed by decomposition and dehydration of the reaction product was subjected to distillation to remove acetone. After distillation of the major amount of acetone, the feed mixture including a relatively small amount of acetone, cumene, α-methylstyrene (AMS), phenol, acetophenone, and high boiling polymeric materials, was distilled to remove an overhead stream comprising cumene, α-methylstyrene, phenol, and a small amount of acetone. This stream was then charged to a hydrotreater wherein hydrogenation was effected, using a catalyst consisting of 0.5% palladium on 1/8″ alumina pellets. Space velocity was 1.05. The data is shown in Table III.

As is seen, substantial conversion of α-methylstryrene to cumene is accomplished without appreciable effect on the phenol. In addition, the color of the mixture on chlorination is substantially improved.

TABLE III

| Sample | Hydrogenator hottest temp., °F. | p.s.i.g. | Percent acetone | Percent cumene | Percent AMS | Percent phenol | pH | Hellige No. 600DA chlorination color |
|---|---|---|---|---|---|---|---|---|
| Charge | | | 0.74 | 38.77 | 5.15 | 55.34 | 3.8 | 2 |
| Run No. 5 | 130 | 100 | 0.73 | 44.55 | 0.47 | 54.25 | 4.1 | |
| Run No. 6 | 153 | 100 | 0.74 | 44.26 | 0.17 | 54.83 | 4.7 | 0 |
| Run No. 7 | 174 | 100 | 0.73 | 44.10 | 0.25 | 54.92 | 4.6 | 0 |

An unchlorinated sample of the mixture from Run No. 7 was heated for one hour at 120° C., cooled and chlorinated according to the standard procedure outlined herein. The chlorination color on the Hellige scale was 0 (zero).

To obtain the test results of all the foregoing examples, a gas chromatograph having an accuracy of ±1% was employed. The analyses of these examples were reported on a water-free basis. Inherently, there is 1–2% water in the process, which fractionates out with the cumene in the cumene tower and is drawn off as the bottom layer therefrom.

As is seen from the above data, α-methylstyrene is effectively converted to cumene with no appreciable loss in yield of phenol. The color improvement in the phenol upon chlorination is also shown. The color improvement upon chlorination of phenol was obtained by comparing samples of phenol mixtures which were not hydrotreated and hydrotreated samples of these same mixtures. In conducting the chlorination, 10 milliliters of a sample were placed in a test tube fitted with a fritted glass bubbler welded through a glass stopper and extending to the bottom of the test tube. A gas outlet connection was provided on the glass stopper. Chlorine gas was introduced into the test tube at a rate of 1 liter per minute while maintaining it at a temperature of 80° C.±5° C. Chlorination was stopped when a gain in weight of 4.0–4.5 grams was noted which usually required 6.0–6.5 minutes. Within 30 minutes after chlorination, the chlorinated phenol was transferred to a Helige Comparator Illuminator No. 600–DA employing color disc No. 620 S-10 and the color was determined. The lower number indicates better color.

Those modifications and equivalents which fall within the spirit of the invention and the scope of the appended claims are to be considered part of the invention.

I claim:
1. A process of treating a reaction mixture resulting from the production of phenol by oxidation of cumene and decomposition and dehydration of the reaction product and including acetone, cumene, α-methylstyrene, phenol and impurities which give rise to color formation on chlorination or sulfonation of the phenol, which process comprises subjecting said reaction mixture to distillation to remove acetone therefrom, then subjecting said resulting reaction mixture to fractionation to separate a stream containing cumene, α-methylstyrene, phenol and said impurities hydrogenating the last-mentioned stream by contacting said stream at a temperature of about 50 to 300° F. and a pressure from about atmospheric to 500 p.s.i.g. with hydrogen in the presence of a palladium or nickel-molybdenum hydrogenation catalyst and subjecting the hydrogenation reaction mixture to fractionation to recover cumene and phenol in which color-forming impurities have been inactivated.

2. A process according to claim 1 wherein the hydrogenation is carried out at a temperature of from 150 to 225° F. and a pressure from atmospheric to 100 p.s.i.g.

3. A process according to claim 1 wherein a palladuim hydrogenation catalyst is employed.

4. A process according to claim 1 wherein a nickel-molybdenum hydrogenation catalyst is employed.

References Cited

UNITED STATES PATENTS 3,205,272   9/1965   Pollitzer _____ 260—621

FOREIGN PATENTS 166,709   3/1965   U.S.S.R.

LEON ZITVER, *Primary Examiner.*

H. ROBERTS, *Assistant Examiner.*

U.S. Cl. X.R.

260—667

U.S. DEPARTMENT OF COMMERCE

PATENT OFFICE

Washington, D.C. 20231

UNITED STATES PATENT OFFICE

CERTIFICATE OF CORRECTION

Patent No. 3,441,618                          April 29, 1969

Earl Dan Flickinger

It is certified that error appears in the above identified patent and that said Letters Patent are hereby corrected as shown below:

Column 4, line 57, after "color" insert -- still below 1, and Run No. 4 also gave a chlorination color --. Columns 5 and 6, TABLE III, in the body of the table, line 1 thereof should appear as part of the heading to the columns of the table.

Signed and sealed this 14th day of April 1970.

(SEAL)
Attest:

Edward M. Fletcher, Jr.                        WILLIAM E. SCHUYLER, JR.
Attesting Officer                                     Commissioner of Patents